United States Patent
Hillier

(10) Patent No.: US 9,654,367 B2
(45) Date of Patent: May 16, 2017

(54) SYSTEM AND METHOD FOR DETERMINING AND VISUALIZING EFFICIENCIES AND RISKS IN COMPUTING ENVIRONMENTS

(71) Applicant: Cirba Inc., Richmond Hill (CA)

(72) Inventor: Andrew Derek Hillier, Toronto (CA)

(73) Assignee: Cirba IP Inc., Richmond Hill (CA)

( * ) Notice: Subject to any disclaimer, the term of this patent is extended or adjusted under 35 U.S.C. 154(b) by 100 days.

(21) Appl. No.: 14/180,438

(22) Filed: Feb. 14, 2014

(65) Prior Publication Data

US 2014/0164612 A1 Jun. 12, 2014

Related U.S. Application Data

(63) Continuation of application No. PCT/CA2012/050561, filed on Aug. 16, 2012.

(Continued)

(51) Int. Cl.
*H04L 12/26* (2006.01)
*H04L 12/24* (2006.01)
(Continued)

(52) U.S. Cl.
CPC ........ *H04L 43/0876* (2013.01); *G06F 11/328* (2013.01); *G06F 11/3442* (2013.01);
(Continued)

(58) Field of Classification Search
CPC ............. G06F 11/3433; G06F 11/3447; G06F 9/5011; G06F 5/161; H04L 43/0876; H04L 41/147; H04L 47/20
(Continued)

(56) References Cited

U.S. PATENT DOCUMENTS 6,148,335 A 11/2000 Haggard et al.
8,087,025 B1 * 12/2011 Graupner ................ G06F 9/505
                                                            718/104

(Continued)

FOREIGN PATENT DOCUMENTS

CA 2583582 A1 5/2006
CA 2649714 A1 11/2007

(Continued)

OTHER PUBLICATIONS

Goiri, I. et al. "Energy-aware Scheduling in Virtualized Datacenters"; 2010 IEEE International Conference on Cluster Computing; Sep. 20, 2010; pp. 58 to 67; ISBN: 978-1-4244-8373-0.

(Continued)

*Primary Examiner* — Tesfay Yohannes
(74) *Attorney, Agent, or Firm* — Blake, Cassels & Graydon LLP; Brett J. Slaney

(57) ABSTRACT

A system and method are provided for determining and visualizing efficiencies and risks in computing environments. The method comprises obtaining resource utilization data and resource capacity data for a plurality of entities in a computing environment; obtaining at least one operational policy defining at appropriate level of at least one resource used by the computing environment according to at least one factor; and computing at least one score quantifying efficiencies and risks associated with the computing environment based on the resource utilization data, resource capacity data, and at least one operational policy.

19 Claims, 12 Drawing Sheets

Related U.S. Application Data

(60) Provisional application No. 61/523,912, filed on Aug. 16, 2011.

(51) Int. Cl.
  *G06F 11/34*   (2006.01)
  *G06F 11/32*   (2006.01)

(52) U.S. Cl.
  CPC ...... *H04L 41/0896* (2013.01); *G06F 11/3409* (2013.01); *G06F 2201/815* (2013.01)

(58) Field of Classification Search
  USPC .................................. 709/204, 226; 370/223
  See application file for complete search history.

(56) References Cited

U.S. PATENT DOCUMENTS

| | | | | |
|---|---|---|---|---|
| 2003/0046396 | A1* | 3/2003 | Richter | G06F 9/505 709/226 |
| 2007/0165019 | A1* | 7/2007 | Hale | G06Q 10/00 345/418 |
| 2007/0250829 | A1 | 10/2007 | Hillier et al. | |
| 2008/0028409 | A1* | 1/2008 | Cherkasova | G06F 9/5061 718/104 |
| 2009/0037367 | A1* | 2/2009 | Wein | G06F 9/5061 |
| 2009/0292715 | A1 | 11/2009 | Chiaramonte et al. | |
| 2010/0082505 | A1 | 4/2010 | Hollingsworth et al. | |
| 2012/0011077 | A1* | 1/2012 | Bhagat | G06F 21/554 705/317 |
| 2012/0140620 | A1* | 6/2012 | Hogan | H04L 41/0893 370/230 |
| 2012/0159476 | A1* | 6/2012 | Ramteke | G06F 9/5033 718/1 |
| 2012/0284408 | A1* | 11/2012 | Dutta | G06F 9/5066 709/226 |
| 2013/0041768 | A1* | 2/2013 | Llach | G06Q 20/28 705/17 |

FOREIGN PATENT DOCUMENTS

| | | |
|---|---|---|
| WO | 2007/147258 A1 | 12/2007 |
| WO | 2011/011408 A1 | 1/2011 |

OTHER PUBLICATIONS

Lanches, P.; Supplementary European search report from corresponding European Application No. 12824582.6; search completed May 6, 2015.

"How to Measure & Manage Efficiency in Virtual Environments Using CiRBA's Efficiency & Risk Dashboard"; Online Mar. 23, 2011; CiRBA.

Hillier, Andrew; "Server Capacity Defrag: Maximizing Infrastructure Efficiency through Strategic Workload Placements (Defrag Isn't Just for Storage Anymore!"; Jan. 24, 2011; CiRBA Inc.; <http://www.cirba.com/forms/Server-Capacity-Defrag.htm>.

Hillier, Andrew; "Transformational Analytics: Virtualizing IT Environments"; Apr. 2008; CiRBA Inc.; <http://www.cirba.com/forms/Transformational-Analytics-Virtualizing-IT-Environments.htm>.

Hillier, Andrew; "Advanced Workload Analysis Techniques"; Apr. 2008; CiRBA Inc.; <http://www.cirba.com/forms/Advanced-Workload-Analysis-Techniques.htm>.

"Thanks for attending yesterday's live demo of the Efficiency & Risk dashboard"; Twitter Status Update from CiRBA @CiRBA; Mar. 24, 2011; <https://twitter.com/CiRBA/status/51018299923894272>.

Matheson, L.; Search Report from corresponding PCT/CA2012/050561; search completed Nov. 15, 2012.

* cited by examiner

FIG. 11

| | |
|---|---|
| Edit Policy -- Webpage Dialog | |
| Analysis Models: | CiRBA Control for VMware - Today Timeline |
| Policy Name: | VMware Control - Dev/Test (Ramp Up) |
| Description: | BC - Set to fixed date 2012-06-15 |
| | - Policy that strongly favors efficiency over performance and uptime of development and test workloads. |
| | - Key policy settings include modeling workloads by combining historical data that excludes outlier data, liberal host and guest resource overcommit and utilization |

☐ Show Advanced Settings

Policy Categories and Settings:

▼ Placement Compatibility - Technical

| | |
|---|---|
| Keep Load Balancing Members Apart | No |
| Keep Different OS Types Apart | No |
| Keep Application Tiers Apart | No |

▶ Placement Compatibility - Business

▶ Placement Compatibility - Security & Compliance

▶ High Availability

▶ Operational Windowing

▼ Reservations & Overcommit

| | | |
|---|---|---|
| Total CPUs - High Limit | 800 | |
| Total Memory - High Limit | 200 | % |
| CPU Reservations - High Limit | 90 | % |
| Memory Reservations - High Limit | 90 | % |

▶ Workload History & Trending

▶ Host Level Utilization (High Limits)

Save    Cancel

SYSTEM AND METHOD FOR DETERMINING AND VISUALIZING EFFICIENCIES AND RISKS IN COMPUTING ENVIRONMENTS

CROSS-REFERENCE TO RELATED APPLICATIONS

This application is a continuation of International PCT Application No. PCT/CA2012/050561 filed on Aug. 16, 2012 which claims priority from U.S. Provisional Patent Application No. 61/523,912 filed on Aug. 16, 2011, both incorporated herein by reference.

TECHNICAL FIELD

The following relates to systems and methods for determining and visualizing efficiencies and risks in computing environments.

DESCRIPTION OF THE RELATED ART

Modern data centers typically comprise hundreds if not thousands of servers. Each server supplies a finite amount of resource capacity, typically in the form of, but not limited to: central processing unit (CPU) capacity, memory or storage capacity, disk input/output (I/O) throughput, and network I/O bandwidth. Workloads running on these servers consume varying amounts of these resources. With the advent of virtualization and cloud technologies, individual servers are able to host multiple workloads.

Percent CPU utilization, which corresponds to the ratio of CPU usage relative to CPU capacity, is a common measure of how effectively servers are being utilized. Various other metrics may be used to determine resource utilization for computing systems. Organizations may wish to measure and evaluate efficiencies and risks in computing environments but often do not have convenient ways to perform such measurements and evaluations.

SUMMARY

In one aspect, there is provided a method comprising: obtaining resource utilization data and resource capacity data for a plurality of entities in a computing environment; obtaining at least one operational policy defining at appropriate level of at least one resource used by the computing environment according to at least one factor; and computing at least one score quantifying efficiencies and risks associated with the computing environment based on the resource utilization data, resource capacity data, and at least one operational policy.

In another aspect, there is provided a computer readable storage medium comprising computer executable instructions for performing the method.

In yet another aspect, there is provided a system for analyzing efficiencies and risks in a computing environment, the system comprising a processor and at least one memory, the memory comprising computer executable instructions for performing the method.

BRIEF DESCRIPTION OF THE DRAWINGS

Embodiments will now be described by way of example only with reference to the appended drawings wherein:

FIG. 11 is an example screen shot for an operational policy user interface; and

FIG. 12 is an example screen shot for a system policy user interface.

DETAILED DESCRIPTION

Figure 1:
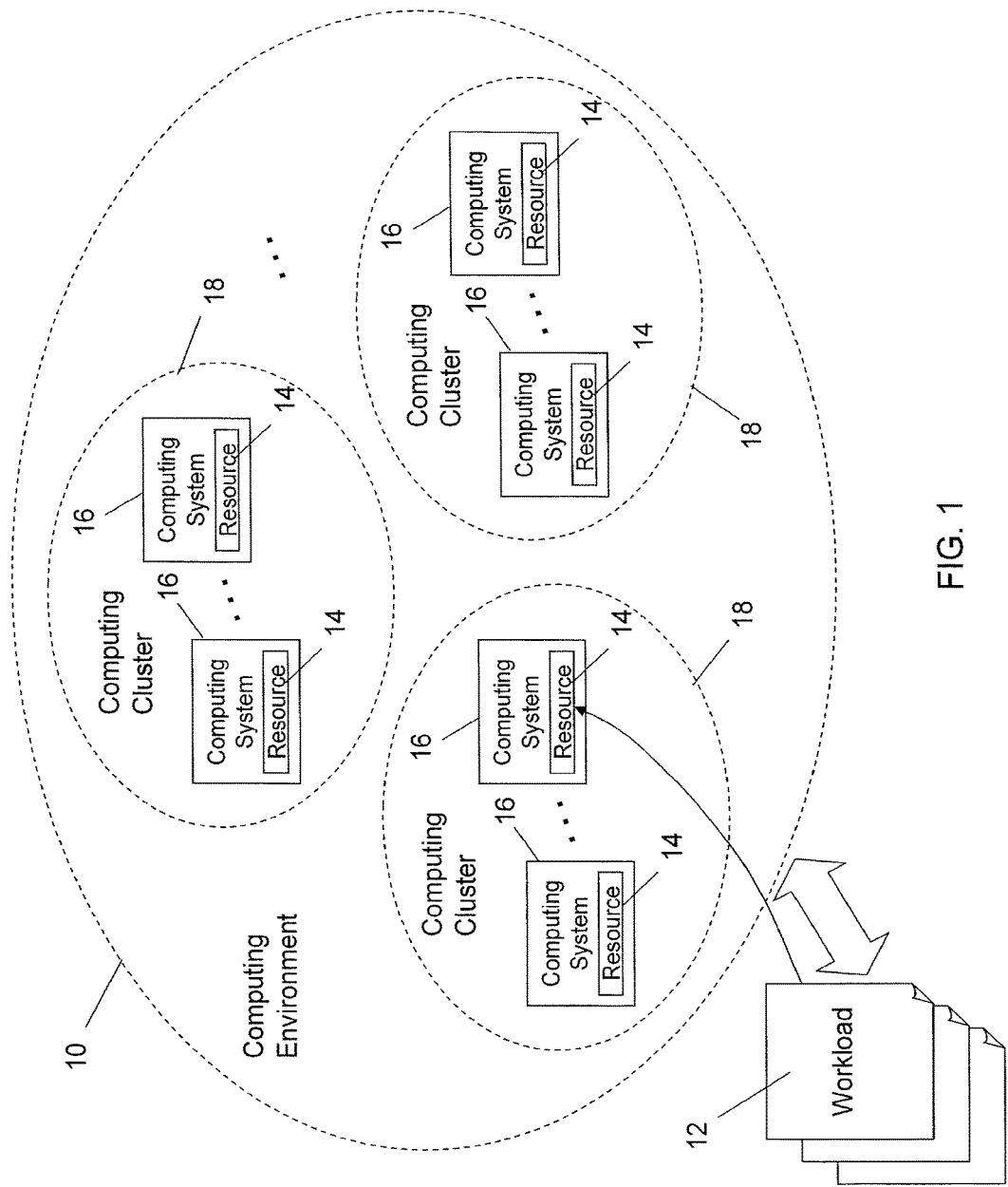
FIG. 1 is a schematic diagram of a computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

A system and method are provided for quantifying and visualizing the efficiency and risks related to resource utilization levels, relative to the provisioned capacity of computing environments, with consideration of operational policies. In addition, the system may be configured to determine and presents recommended actions that mitigate the inefficiencies and risks detected for the computing environments being analyzed. The capabilities of the system herein described enable organizations to accurately measure efficiency and risks in physical, virtual and cloud computing environments. It has been recognized that through the recommended actions, organizations can increase efficiency and reduce risks in their computing environments.

An example of a computing environment 10 is shown in FIG. 1. Computing environments 10 can be virtual or physical. Virtual computing environments 10 may be based on various virtualization platforms such as VMware vSphere, IBM PowerVM, Microsoft Hyper-V, Oracle/Sun Logical Domains, etc. Physical computing environments 10 may be based on various server platforms such as IBM Power, Oracle/Sun SPARC and x86-based servers, etc. As illustrated in FIG. 1, a computing environment 10 is designed and/or provided to run at least one workload 12 that performs business functions and consume compute resources 14, e.g., resources 14 related to CPU, memory, disk, network, etc. The workloads 12 run on computing systems 16 such as servers that supply the computing resources 14. Each computing system 16 has a finite capacity of resources 14. Multiple computing systems 16 can form a computing cluster 18 reflecting, for example, an administrative group or a management domain. Such groups or domains may support advanced capabilities such as live migration of workloads 12 between computing systems 16, load balancing and/or high availability. Multiple computing clusters 18 can be logically grouped (e.g., by location, line of business, etc.) to form a computing environment 10 as is illustrated in FIG. 1.

It can be appreciated that the principles discussed herein apply to any one or more workloads 12 consuming any one or more resources 14 provided by any one or more computing systems 16, in any one or more computing clusters 18, in one or more computing environments 10. As such, the example shown in FIG. 1 is for illustrative purposes only.

Many computing environments 10 may be modeled through the entity types shown in FIG. 1, and may include associated parent-child relationships. Workloads 12 are considered resource consumers, typically with configurable resource allocations. Computing systems 16 such as servers are considered resource suppliers containing one or more workloads 12. Computing clusters 18 are considered collections of computing systems 16 (e.g. a server farm) with mobility of workloads 12 between computing systems 16 in a computing cluster 18 being possible. The computing environments 10 are typically defined by a collection of one or more computing clusters 18.

For example, VMware vSphere computing environments 10 can be modeled with the following entity types. A guest is considered a virtual machine running on a host for performing actual workloads 12. A host is a physical computing system 16 running the ESX hypervisor capable of running one or more virtual machines. A computing cluster 18 therefore enables hosts to be managed as a group capable of supporting capabilities such as live migration of workloads 12 between hosts, automated workload balancing and high availability of guest workloads 12. A datacenter in this example is considered a computing environment 10 including one or more computing clusters 18.

In another example, IBM PowerVM computing environments 10 can be modeled with the following entity types. Logical Partitions (LPARs) are considered virtual machines running on managed computing systems 16 for performing actual workloads 12. Managed systems are considered physical computing systems 16 (e.g. servers) capable of running one or more LPARs. A domain is considered a group of managed systems administered by a common hardware management controller (HMC). An environment in this example is a computing environment 10 including one or more management domains.

It can be appreciated that depending on the computing environment 10 and technology being modeled, additional entity types and parent-child relationships are possible. For example, workloads 12 can often be divided into multiple applications. In addition, some virtualization technologies support the creation of resource pools to divide processor and/or memory resources that are allocated by servers to their workloads 12.

Figure 2:
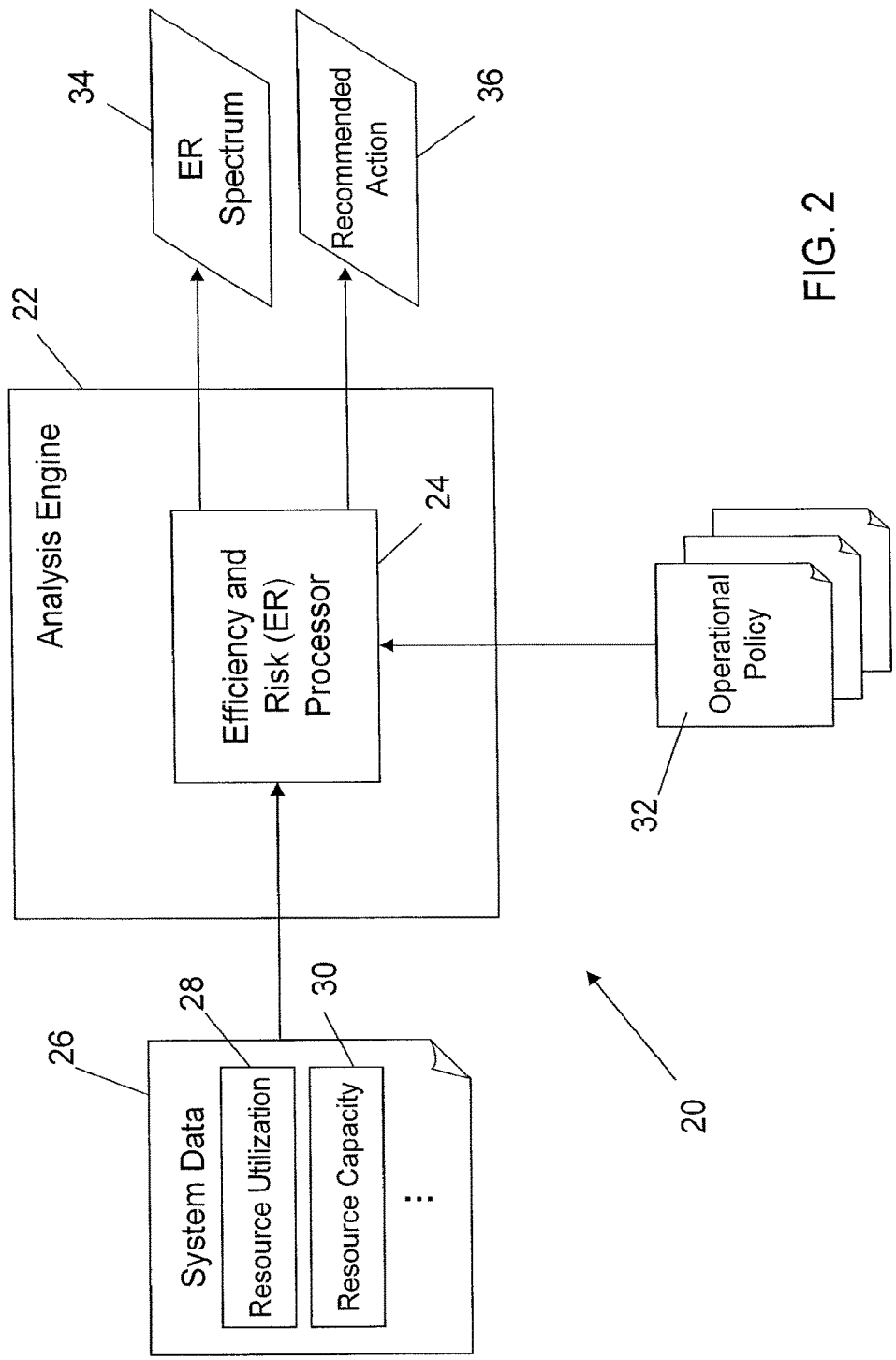
FIG. 2 is a block diagram of functional components configured to perform an efficiency and risk analysis using resource utilization and capacity data and operational policies.

Turning now to FIG. 2 an example of an analysis system 20 is shown. It can be appreciated that the analysis system 20 may be configured using software, hardware or any combination of software and hardware. For example, the analysis system 20 may reside on a personal computer, embedded computer, mobile computing device, etc. It can also be appreciated that the configuration and functional delineations shown in FIG. 2 are for illustrative purposes only. The system 20 includes an analysis engine 22 that comprises an efficiency and risk (ER) processor 24. The ER processor 24 utilizes system data 26 related to the computing systems 16 in a particular cluster 18 and/or computing environment 10 to quantify and visualize the efficiency and risks for a computing environment 10. The system data 26 includes, without limitation, resource utilization data 28 and resource capacity data 30 for conducting the analyses (as shown), and well as, for example, system configuration data and business related data (e.g., guest and host operating systems, guest workload uptime requirements, guest workload security level requirements, guest workload and host maintenance windows, guest workload balancing groups, guest workload high availability groups, etc.) The ER processor 24 also obtains operational policies 32 to be considered when analyzing such efficiencies and risks. In evaluating the efficiencies and the risks, the analysis engine 22 may output at least one ER spectrum 34 related to the computing environment 10 which, as described below, depicts efficiencies and risks in the computing environment 10 based on ER scores. The analysis engine 22 may also output recommended actions 36 based on the ER scores. The outputs 34, 36 shown in FIG. 2 may be displayed graphically as illustrated below.

As discussed above, computing resources 14 are consumed by workloads 12 and supplied by computing systems 16 such as servers. Typically, the resources 14 fall into four main areas: a) CPU—processing capacity, b) Memory—physical and virtual memory, c) Disk—disk storage and disk I/O bandwidth, and d) Network I/O—network interfaces and network I/O bandwidth.

The operational policies 32 help define the appropriate levels of resources 14 required by a computing environment 10 by considering factors such as, without limitation: performance/service level requirements, workload growth assumptions (planned and trended), uptime-related requirements (hardware failures, disaster recovery, maintenance windows, etc.), and workload placement affinity and anti-affinity (data security, load balancing, failover, etc.). It has been recognized that by combining the operational policies 32 with the actual resource utilization levels indicated in the resource utilization data 28, resource capacities indicated in the resource capacity data 30, system configuration data, and business attributes, the efficiencies and risks of a computing environment 10 can be assessed.

The efficiency and risks of a computing environment can be quantified through an efficiency/risk (ER) score for each entity. The ER score for an entity is based on its utilization levels, allocated or available resources (e.g., determined from system data 26) and operational policies 32. At a high level, the ER score reflects whether the resources for the entity are appropriately provisioned, under-provisioned, or over-provisioned.

An example range for ER scores is from 0 to 200 and the significance of the score is summarized below in Table 1 for illustrative purposes only.

TABLE 1

Example ER score ranges and descriptions

| ER Score | Description |
| --- | --- |
| 0 to 74 | Entity is under-provisioned. Lower scores indicate more severe levels of under-provisioning. |
| 75 to 125 | Entity is appropriately provisioned. Scores closer to 100 indicate more optimal provisioning levels. |
| 126 to 200 | Entity is over-provisioned. Higher scores indicate greater levels of over-provisioning |

Figure 3:
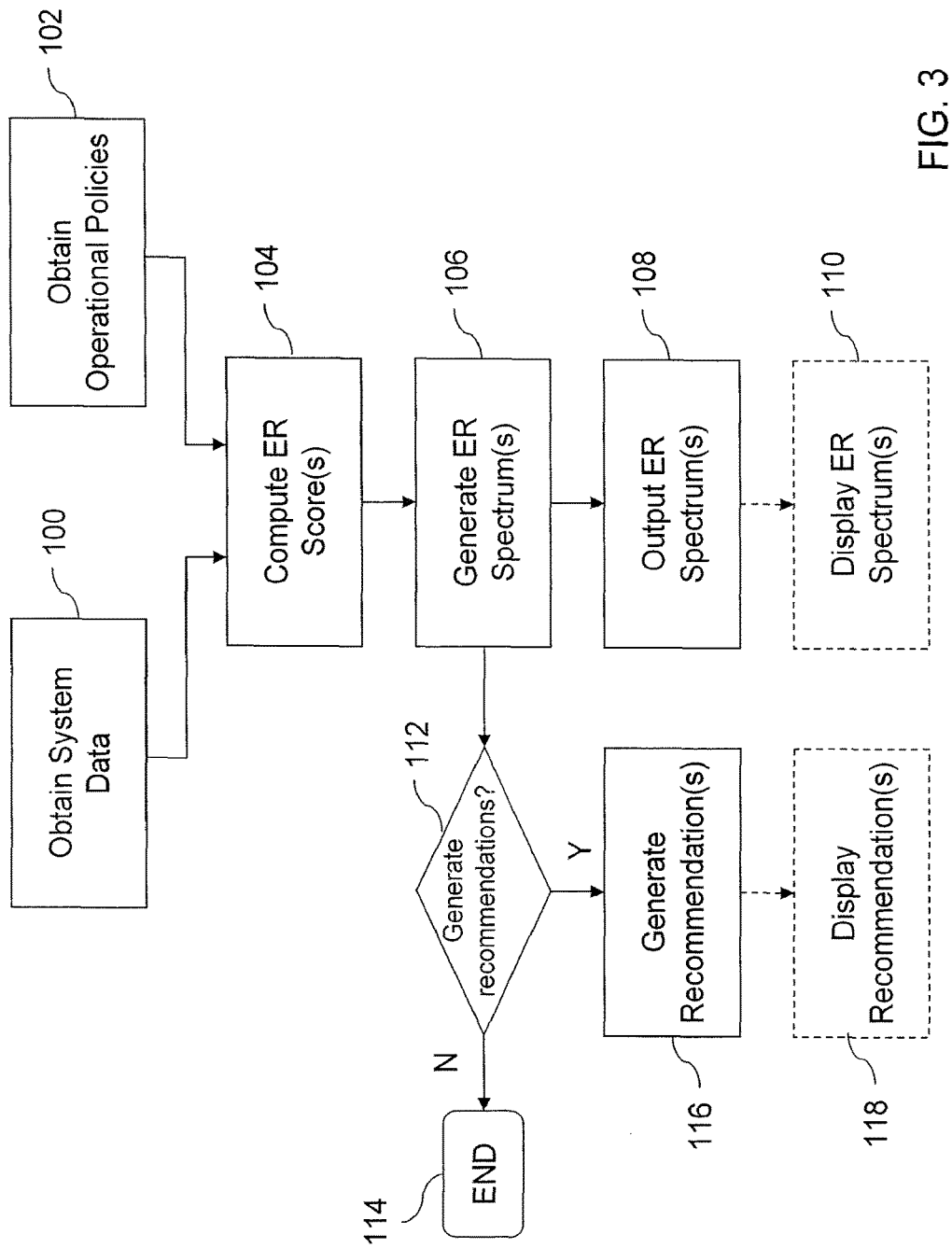
FIG. 3 is a flow chart illustrating example computer executable operations that may be performed in conducting an efficiency and risk analysis.

The ER score may be used to generate ER spectrums and, optionally, recommended actions and/or other recommendations for addressing efficiency and/or risk issues identified via the computed ER scores. FIG. 3 illustrates computer executable operations that may be performed by the ER processor 24 in conducting an analysis of system data 26 and operational policies 32. At 100 the system data 26 is obtained in order to analyze the resource utilization data 28 and the resource capacity data 30. At 102 the operational policy 32 (or policies 32) are obtained. The system data 26 and the operational policies 32 are used at 104 to compute one or more ER scores according to the nature of the computing environment 10 being evaluated. As will be explained in greater detail in the examples below, the ER score(s) is/are used at 106 to generate one or more ER spectrums. The ER spectrums are output at 108 and, if applicable, are displayed at 110.

As noted above, the ER scores may also be used to generate recommended actions and/or other recommendations. At 112, the ER processor 24 determines whether or not such recommendations are to be generated, e.g., by determining whether an option or input has been selected. If not, the process ends at 114. If a recommendation is to be generated, the recommendation(s) is/are generated at 116 and, if applicable, displayed at 118.

An example for computing ER scores for various entity types will now be described below.

Workload-Level ER Score

The ER score for a workload entity (e.g., vSphere guest, LPAR) is based on the following:

Resource utilization levels of the entity (e.g. CPU utilization, memory utilization);
Resource allocations (e.g. CPU allocation, memory allocation); and
Operational policies 32 that define the criteria to determine whether sufficient CPU and memory resources have been allocated for the entity. It may be noted that some operational policies 32 can be specified on a per-workload level. For example, different % CPU utilization high limits can be specified for different workloads 12, depending on the business or operational requirements of the different workloads 12 (e.g. production workloads 12 may have lower limits that non-production workloads 12).

The ER scores for the workload entities can be based on the results of two types of analyses:

1) Under-Provisioned Analysis—evaluates each workload entity by checking whether the entity's resource utilization levels exceed high limits defined by operational policies 32. The check generates an under-provisioned score (UPS), in this example, ranging between 0 and 100 that reflects whether the entity is under-provisioned. For example, scores less than 75 may indicate that the entity is under-provisioned, whereas scores greater than 75 indicate that the entity is appropriately provisioned.

2) Over-Provisioned Analysis—evaluates each workload entity by checking whether the entity's resource utilization levels are below low limits defined by operational policies. The check generates an over-provisioned score (OPS) ranging, in this example, between 0 and 100 that reflects whether the entity is over-provisioned. For example, scores less than 75 may indicate that the entity is over-provisioned whereas scores greater than 75 indicate that the entity is appropriately provisioned.

Based on the under-provisioned and over-provisioned scores, the ER score for a workload entity can be determined as follows:

If UPS<100, ER score=UPS
If UPS==100, ER score=200−OPS

As such, the UPS may be made to take precedence over the OPS when computing the ER score of a workload entity which reflects its overall provisioning level. For example, an entity may be under-provisioned with respect to CPU utilization but over-provisioned with respect to memory. Based on the overall ER score, the entity is designated to be under-provisioned. This is appropriate since the shortage of resources typically result in more severe consequences than having excess resources (i.e. risks vs. inefficiency).

Server-Level ER Score

The ER score for computing system 16 such as a server entity (e.g. vSphere host, managed system) is based on the following:

Resource utilization levels of the server (CPU, memory, disk I/O, network I/O utilization);
Resource capacity of the server (CPU capacity, memory capacity, maximum disk and network I/O throughput); and
Operational policies (criteria to determine whether server has sufficient resources).

The ER scores for server entities may be determined in the same way as those for workload entities, discussed above.

Cluster-Level ER Score

The ER score for a computing cluster 18 may be based on the results of a "defrag" analysis of workloads 12 and computing devices 16 included in the cluster 18.

A defrag analysis as herein described attempts to determine the maximum number of workloads 12 that can be placed on the minimum number of computing devices 16 (e.g. servers) subject to constraints defined by the operational policies 32.

The defrag analysis results may include the following metrics, assuming the computing devices 16 being analyzed are servers:

1) Fully loaded utilization ($U_{FL}$)—minimum number of servers required to accommodate all the workloads as a percentage of the total number of servers.

2) Number of unused servers (SU)—number of servers with no workloads. A number of additional servers required (SR) may also be determined, which indicates the additional servers required in case there are insufficient existing servers.

3) Number of unplaced workloads (WU)—number of workloads that were not placed on a server.

4) Number of placed workloads (WP)—number of workloads that were placed on a server.

5) Normalized lowest placement score among all servers with at least one workload (LPS)—the value of this score ranges from 100 to the minimum target score limit (default=75). If the minimum target score limit modified so that it is not equal to 75, this score value is normalized to ensure that it always ranges between 75 and 100.

The ER score is derived from these defrag results as follows:

Case 1: All workloads are placed and the fully loaded utilization is less than 100%
  The ER score is equal to the 200 minus the fully loaded utilization.
  In general, a server group is considered to be over-provisioned if the $U_{FL}$ is less than 75% (which translates to an ER score that is greater than 125).
  If the $U_{FL}$ is between 75% and 99%, the cluster is considered to be appropriately provisioned.

Case 2: All workloads are placed and the fully loaded utilization is equal to 100%
  The ER score is equal to the normalized lowest placement score which is defined to range between 75 and 100. This score indicates that the server group is provisioned appropriately.
  ER scores approaching 100 indicate that cluster is optimally provisioned whereas scores nearing 75 indicate that the cluster is on the verge of being deemed as under-provisioned.

Case 3: One or more workloads are not placed and there are no unused servers
  The ER score is equated to the number of placed workloads divided by the total number of workloads multiplied by 75.
  In this case, the ER score will range between 0 and 75 with lower scores indicating higher ratios of unplaced workloads.

Case 4: One or more workloads are not placed but there are also unused servers
  This indicates that the unplaced workloads are not suitable for the server group.
  The ER score is equal to 200 minus the fully loaded utilization—but is also marked as a special case due to the presence of unsuitable workloads.

In summary, the ER score is computed as follows:
Case 1: (WU==0 AND $U_{FL}$<100)

$ER\ score=200-U_{FL}$

Case 2: (WU==0 AND $U_{FL}$==100)

$ER\ score=LPS$

Case 3: (WU>0 AND SU==0)

$ER\ score=75*WP/(WP+WU)$

Case 4: (WU>0 AND SU>0)

$ER\ score=200-U_{FL}$

Environment-Level ER Score

The ER score for a computing environment 10 reflects the efficiency and risks associated with the clusters that comprise the environment 10.

Typically, it may be assumed that workloads 12 and computing systems 16 have no mobility between clusters 18. For such environments 18, the ER score is computed from the weighted average of the ER scores for each group of computing devices, e.g., a server group as exemplified below.

The weights used to combine the ER scores for each server group sum to 1 and reflect the relative resource capacities of each server group. If servers in all the groups have identical resource capacities, the weights can simply be based upon the number of servers. If the servers have different resource capacities, the weights can be based on a particular resource 14 (e.g. CPU or memory).

Alternatively, weights can be based on the resource 14 that represents the primary constraint for the workloads 12 in the environment 10. The primary constraint can be estimated by comparing the aggregate resource utilization of all the workloads 12 with the capacity of all the servers.

For environments 10 where there is mobility of workloads 12 and servers between the clusters 18, the ER score can be computed from the results of a defrag analysis for the entire environment 10—effectively treating the environment 10 as a single cluster 18.

Efficiency and Risk Spectrums

Figure 4:
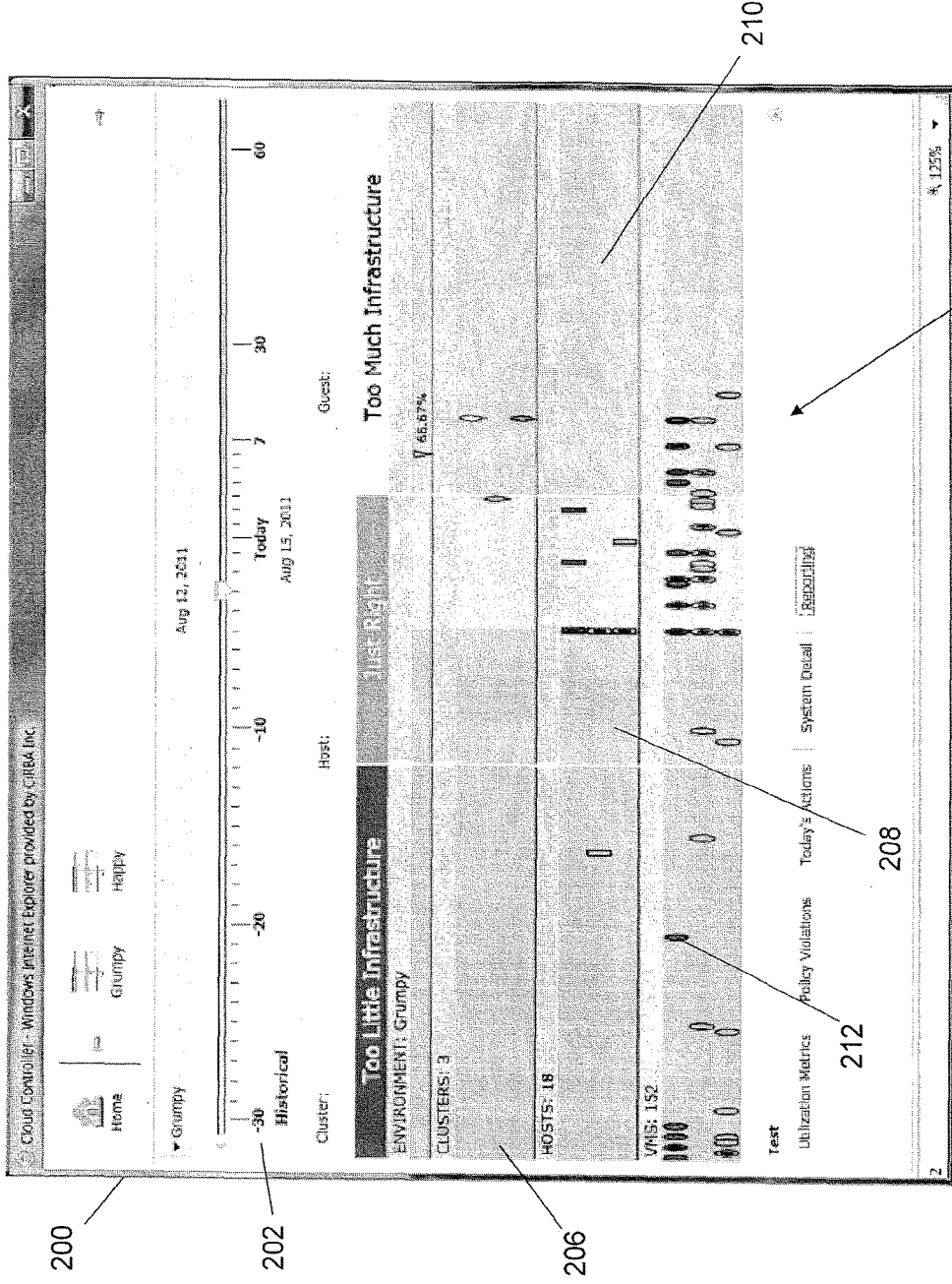
FIG. 4 is an example screen shot including an efficiency risk spectrum for a single computing environment.

Based on the ER scores, the efficiency and risks of computing environments 10 can be depicted in an Efficiency and Risk Spectrum 204 as shown in the screen shot 200 illustrated in FIG. 4. For a given computing environment 10, ER spectrums display the relevant entities in one or more vertically arranged two-dimensional (x-y) coordinate systems. As shown in FIG. 4, a time scale bar 202 can be provided to allow a user to focus on a particular day or period of time.

The number of coordinate systems corresponds to the number of entity types which the environment 10 comprises. For example, the ER spectrum for a computing environment 10 modeled using 4 entity types (e.g. environment 10, cluster 18, host and guest) will also contain 4 coordinate systems.

The coordinate systems share a common horizontal axis representing the ER score. This axis is typically divided into three regions, corresponding to under-provisioned 206 (too little infrastructure), optimally provisioned 208 (just right) and over-provisioned 210 (too much infrastructure) entities, respectively.

Each entity is depicted as a single dot 212 in the spectrum 204. The entity's type determines the coordinate system in which the entity is depicted. The ER score of the entity defines its x-coordinate. For environments 10 having multiple entity groups based on a parent entity type (e.g., workloads 12 and servers belonging to specific clusters 18), the entity's group membership effectively defines its y-coordinate.

Types of ER spectrums that may be generated include:
  ER Spectrum for a single environment 10;
  ER Spectrum for multiple environments 10; and
  ER Spectrum for multiple timeframes.

ER Spectrum for a Single Environment

Based on the ER scores, efficiency and risks of the entities in a computing environment 10 can be depicted in an Efficiency and Risk Spectrum 204 such as that shown in FIG. 4.

In FIG. 4, the spectrum 204 for a single environment (Houston) is organized into four vertically stacked sections corresponding to the four entity types: environment 10, cluster 18, host and guest. Each dot 212 in the spectrum 204 corresponds to an entity. Entities of each type are depicted in the corresponding section. If the environment 10 includes multiple clusters 18, entities associated with each cluster 18 may be depicted in a different color and arranged vertically into separate rows.

Each entity's ER score determines where to draw the corresponding dot 212 on the horizontal axis. The horizontal axis ranges from 0 to 200 with 0 at the left-most edge, 100 at the center and 200 at the right-most edge, consistent with the above exemplary ER score ranges.

The analyses can be based on a variety of historical or projected timeframes selectable from the timeline bar 202, which define the scope of entities to be assessed and their respective resource utilization levels, allocations and capacities.

Figure 5:
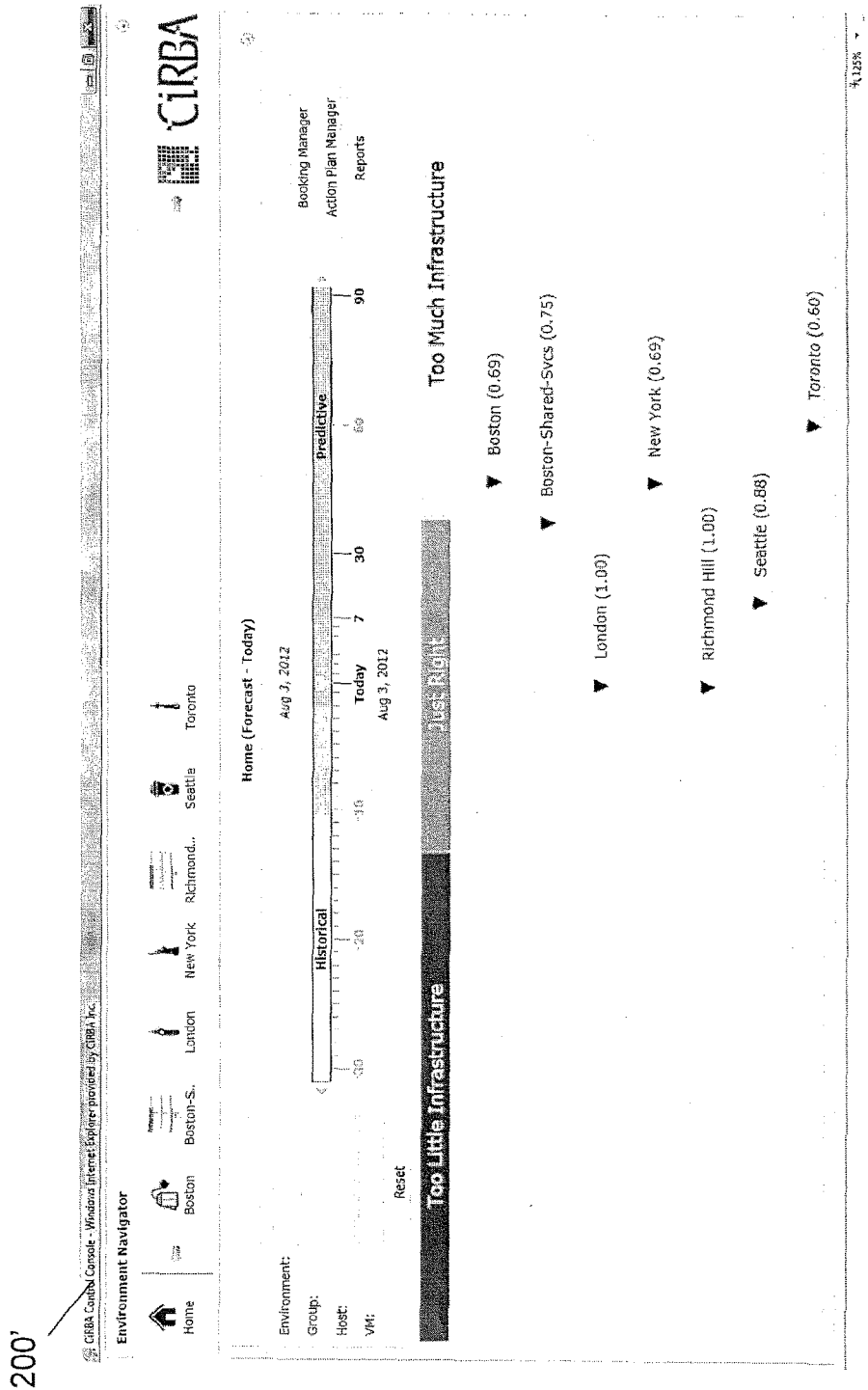
FIG. 5 is an example screen shot including an efficiency risk spectrum for a single computing environment.
Figure 6:
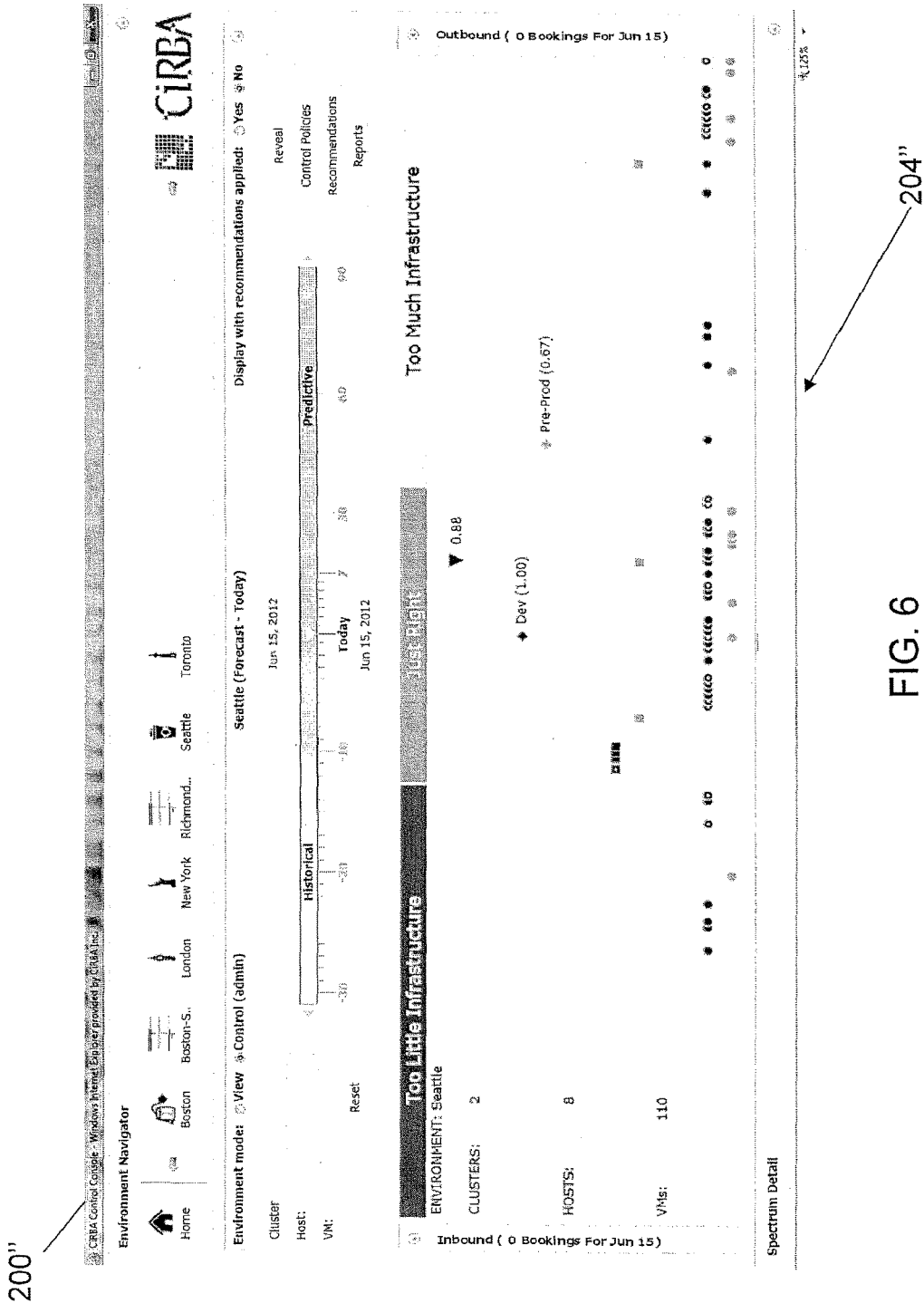
FIG. 6 is an example screen shot including an efficiency risk spectrum for a single computing cluster.

FIG. 5 illustrates a screen shot 200' of another environment level ER spectrum 204' and FIG. 6 illustrates a screen shot 200" of a cluster level ER spectrum 204" for the "Seattle" cluster shown in FIG. 5.

ER Spectrum for Multiple Environments

Figure 7:
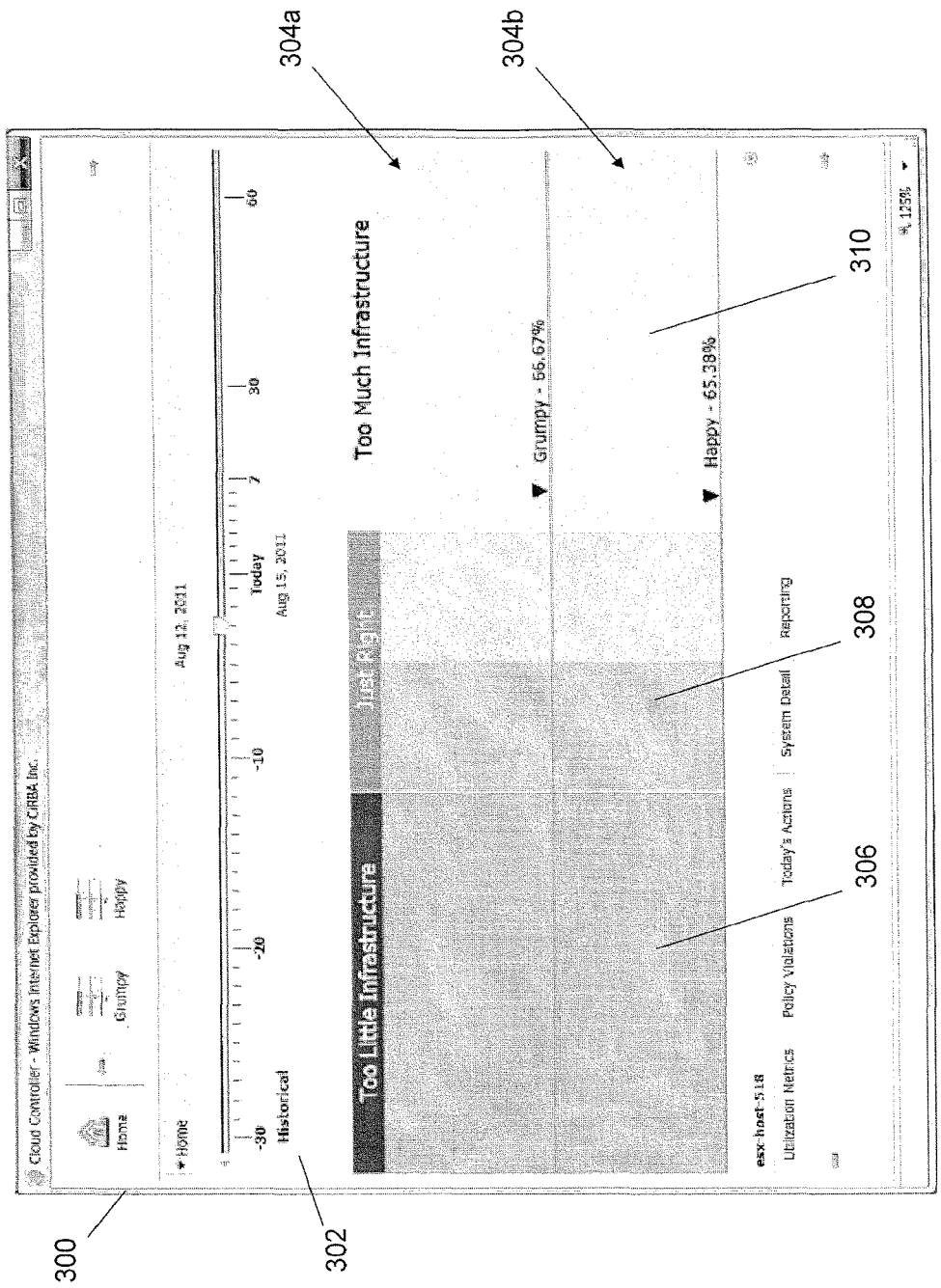
FIG. 7 is an example screen shot including an efficiency risk spectrum for multiple computing environments.

The screen shot 300 shown in FIG. 7 illustrates a pair of ER spectrums 304a, 304b, one for each of multiple environments 10. Providing multiple spectrums 304a, 304b together as shown in FIG. 7 allows multiple environments 10 to be compared by depicting the key metrics (e.g., fully loaded utilization) of each environment 10. It can be appreciated that users can interact with these spectrums 304a, 304b by selecting a specific environment 10 to access the ER spectrum 304a, 304b for the selected environment 10 (showing all the entities comprising the environment 10 as shown in FIGS. 4 and 5).

ER Spectrum for Multiple Timeframes

Another variant of the ER spectrum 204, 304 can depict the key metrics of an environment 10 over time. For example, the fully loaded utilization of an environment can be charted for a given time range (e.g., each day for the last 30 days). For example, for a given environment 10 for which the fully loaded utilization has been computed over the last 30 days, a spectrum charting the historical values over the given time period can be generated. The spectrum can be oriented with ER score with on the x-axis and the time line on the y-axis. The desired spectrum snapshot may then be selected using the timeline bar 202, 302. Alternatively, the ER score and timelines can be transposed so that the spectrum 204, 304 shows the ER-score on the y-axis and the time line of the x-axis.

Recommended Actions

Based on the analyses performed for each environment 10, recommendations to mitigate the inefficiencies and risks depicted in the ER spectrum 204, 304 can be generated.

Examples of recommended actions include:
Per-guest resource allocation adjustments (e.g. CPU allocations and memory allocations of guests that match their actual resource utilization patterns);
Workload rebalancing by changing guest-host placements within a given cluster 18 (e.g. move guests from busier to less busy hosts to better balance workloads within a cluster 18);
Adjustment of host server capacity for a given cluster 18 (e.g. addition or removal of server capacity to match requirements of actual guest workloads); and
Number of additional host servers required to host the existing guest workloads.

Figure 8:
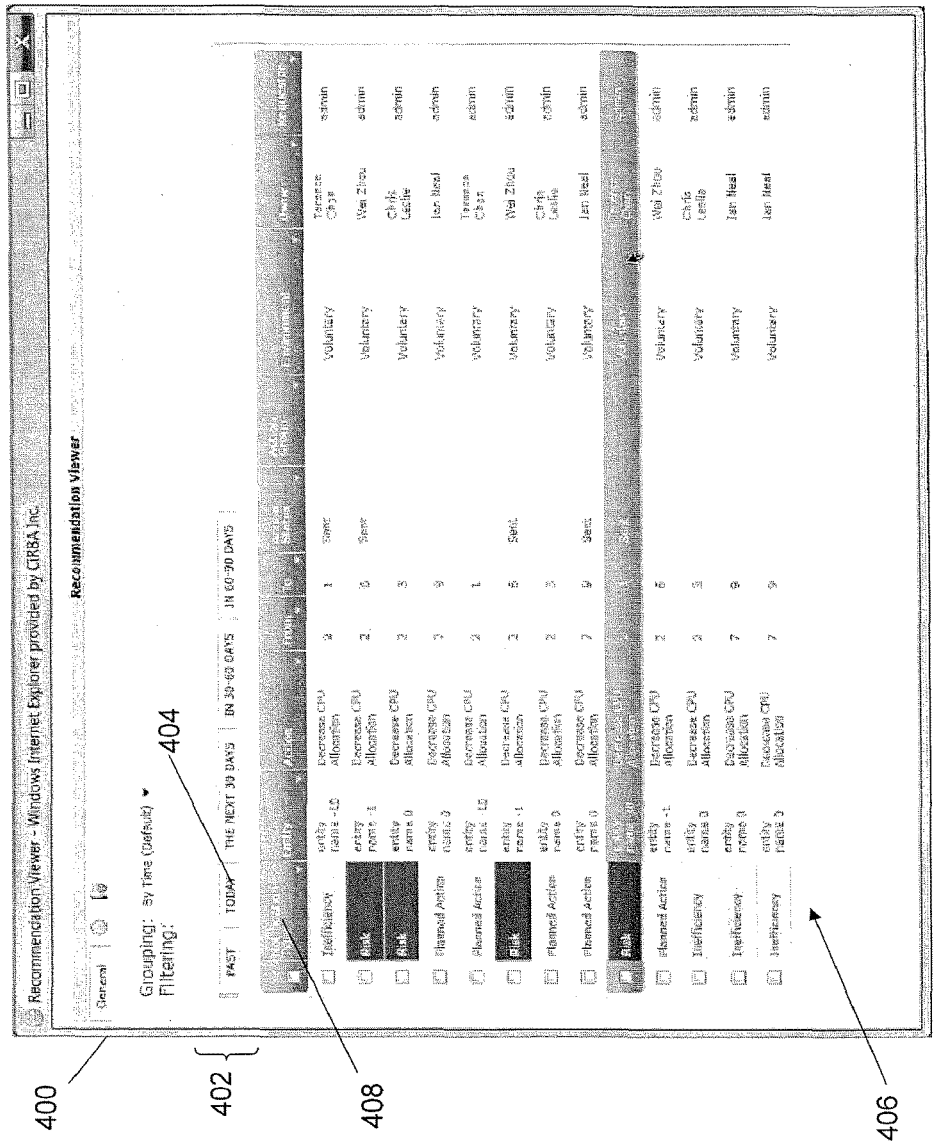
FIG. 8 is an example screen shot including a recommended actions output.
Figure 9:
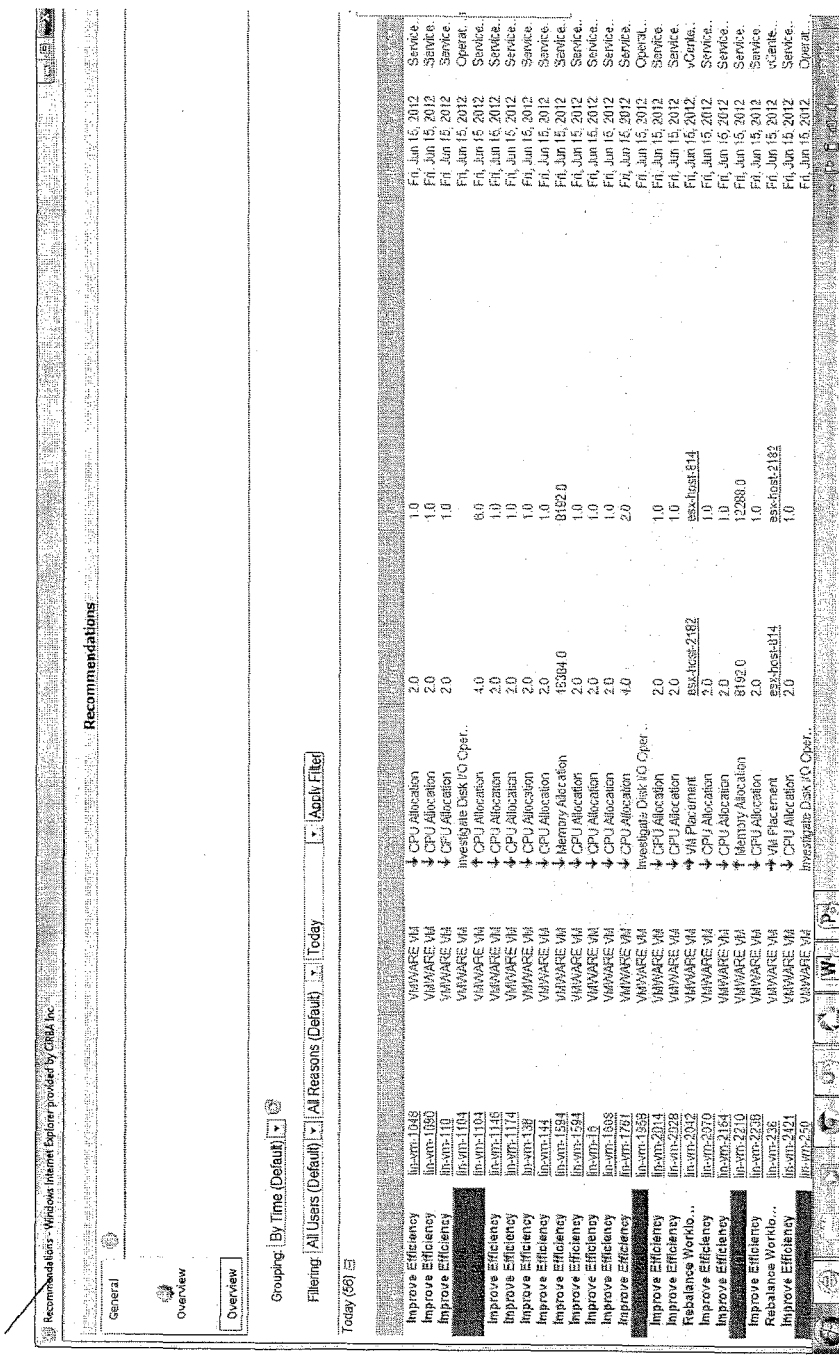
FIG. 9 is an example screen shot including a recommended actions output.

These recommendations can correspond to different timeframes for a given environment. An example set of recommended actions are provided in the screen shot 400 shown in FIG. 8. As shown in FIG. 8, the screen shot 400 may include a series of tabs 402 including different time periods. The "Today" tab 404 is shown in FIG. 8 and includes a modification type 408 at the beginning of each row of the recommendation chart 406 to identify, e.g., whether the recommendation relates to an inefficiency or risk. FIG. 9 illustrates another example screen shot 400' showing a recommendation chart 406'

In general, it can be appreciated that the implementation of the recommended actions should reduce inefficiencies and risks, resulting in entities moving towards the optimal (just right) region of the spectrum 204, 304.

Another example of a recommended action applies to virtual environments managed as a cloud computing environment. Specifically, many cloud computing environments are managed with cloud instance sizes that are configured with pre-defined resource allocations (e.g. small=1 virtual CPU and 2 GB of memory, medium=2 virtual CPUs and 4 GB of memory, large=4 virtual CPUs and 8 GB of memory, etc.). In such environments, the recommended action may be to propose an alternate cloud instance size based on the workload's actual utilization levels and applicable policies.

Figure 10:
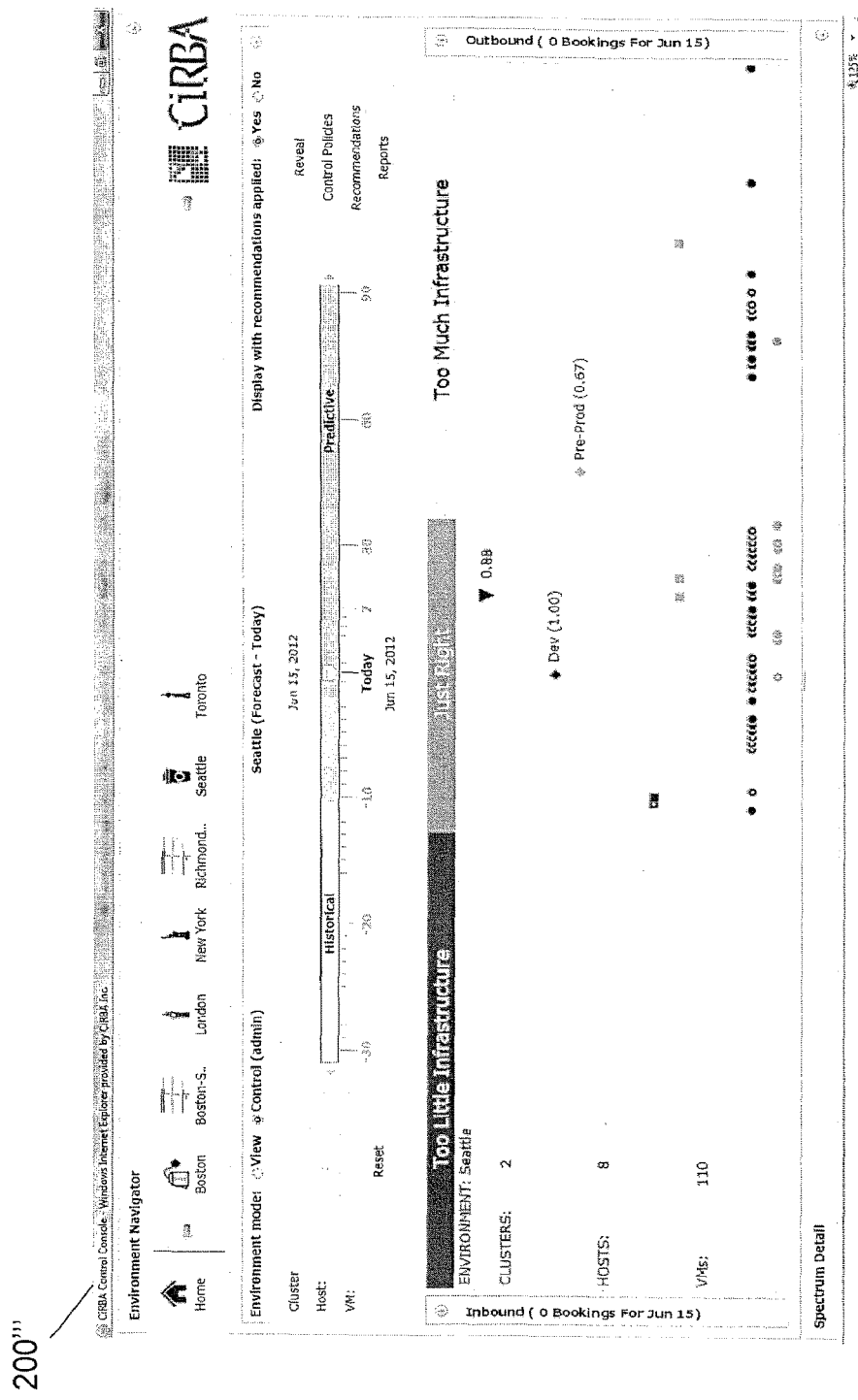
FIG. 10 is an example screen shot including an efficiency risk spectrum for a cluster with recommendations applied.

An additional mode for the ER spectrum 204, 304 can be generated where the recommended actions are assumed to have been performed, e.g., as shown in screen shot 200'" illustrated in FIG. 10. In this scenario, the ER scores for each level (workloads 12, hosts, clusters 18, environment 10) are recomputed based on the application of the recommended actions such as allocation changes and workload placements. In general, the position of the entities in the resulting spectrum 204, 304 where the recommended actions are performed will tend to move towards the center of the spectrum. Another possible mode involves recomputing the ER spectrum 204, 304 based on a subset of the recommended actions. Another possible mode involves computing the ER spectrum based on a set of actions specified by the user to model a desired scenario—e.g. add workloads 12, remove workloads 12, add hosts, upgrade resource capacity of hosts, etc.

FIG. 11 illustrates an example screen shot 500 for an operational policy user interface. As shown in FIG. 11, the policy name and description and various settings can be edited and/or set by the user. Such settings include those related to high limits for CPUs, memory, CPU reservations, and memory reservations.

Figure 12:
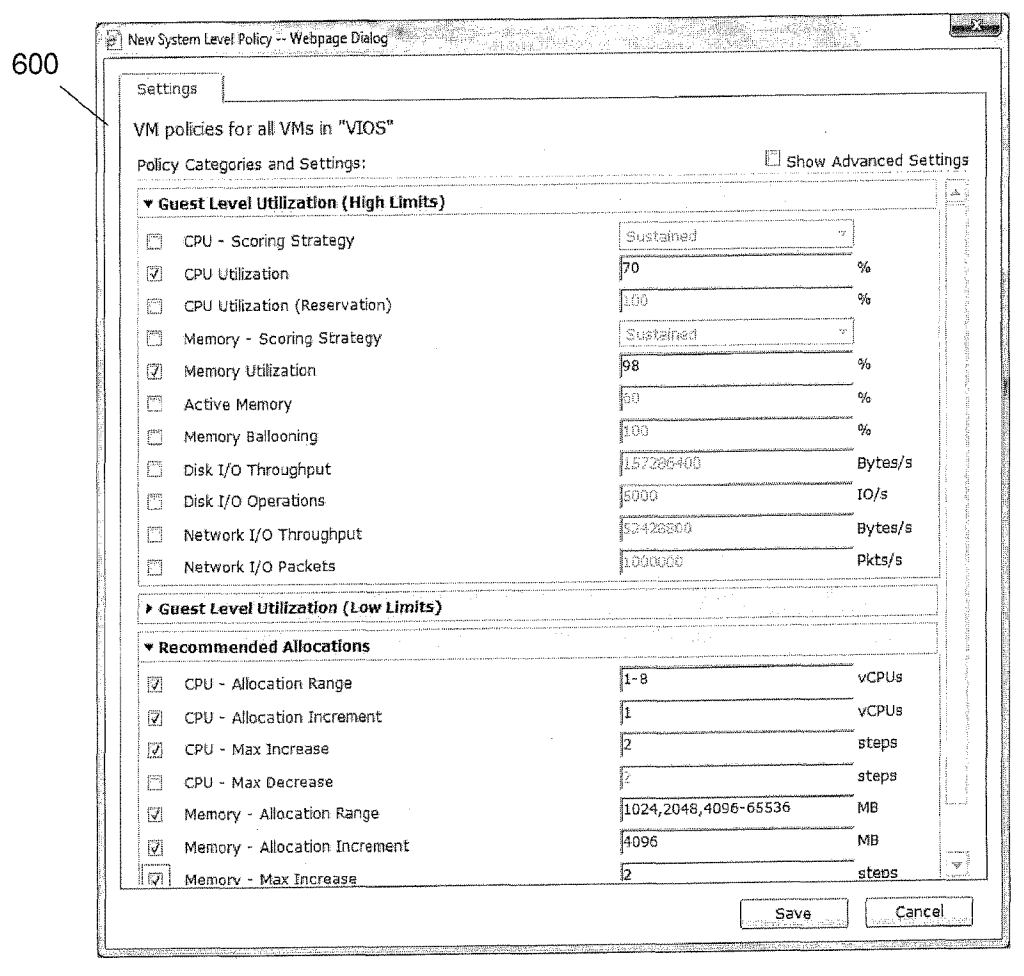

FIG. 12 illustrates an example screen shot 600 for a system-level policy user interface. As shown in FIG. 12, various policy categories and settings can be edited through the illustrated user interface, e.g., those for guest level utilization (high limits), guest level utilization (low limits), recommended allocations, etc.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the analysis engine 22, ER processor 24, any component of or related to the system 20, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method performed by a processor in a computing system, the method comprising:
    obtaining resource utilization or performance data pertaining to a plurality of computing entities in a computing environment, and capacity data specifying resource capacities for the plurality of computing entities in the computing environment;
    obtaining at least one operational policy defining criteria to determine whether the utilization or performance of an entity is in an acceptable range relative to its capacity or performance limits;
    computing at least one score quantifying efficiencies and/or risks associated with corresponding ones of the entities in the computing environment, based on the resource utilization or performance data, the capacity data, and the at least one operational policy; and
    displaying an indicator for at least one of the plurality of computing entities in a graphical representation based on the corresponding score;
    wherein each indicator is positioned in the graphical representation according to the corresponding score such that the positioned indicator shows in a spatial manner, relative efficiencies and/or risks for the corresponding entity by positioning the indicator in one of a first portion indicative of risk associated with having infrastructure in the computing environment that cannot service workload demands and meet criteria specified in the at least one operational policy, a second portion indicative of an amount of infrastructure in the computing environment that can service workload demands based on the at least one operational policy, or a third portion indicative of inefficiencies associated with having more than the required amount of infrastructure in the computing environment to service workload demands based on the at least one operational policy.

2. The method of claim 1, wherein the at least one score is based on an under provisioned score and an over provisioned score.

3. The method of claim 2, wherein the under provisioned score is given precedence over the over provisioned score.

4. The method of claim 1, wherein the at least one score is generated using factors specific to a corresponding one of a plurality of entity types.

5. The method of claim 4, the plurality of entity types comprising any one or more of a workload, a computing system, a cluster of computing systems, and the computing environment.

6. The method of claim 4, wherein for an entity representing a cluster of computing systems, the at least one score being determined by considering a fully loaded utilization value ($U_{FL}$), an unused servers value (SU), an unplaced workloads value (WU), policies business separation and a placed workloads value (WP).

7. The method of claim 6, wherein:
    for WU==0 and UFL<100, the at least one score is computed as $200-U_{FL}$;
    for WU==0 and UFL==100, the at least one score equals a lowest placement score;
    for WU>0 and SU==0, the at least one score is computed as 75*WP/(WP+WU); and
    for WU>0 and SU>0, the at least one score is computed as 200−UFL.

8. The method of claim 1, wherein the graphical representation displays the scores spatially relative to each other, for each computing entity in the computing environment by placing each indicator in a corresponding portion of the graphical representation.

9. The method of claim 1, wherein the portions of the graphical representation are arranged to create a spectrum.

10. The method of claim 1, further comprising displaying a plurality of graphical representations.

11. The method of claim 1, further comprising using the at least one score to generate at least one recommendation for addressing inefficiencies and/or risks in the computing environment.

12. The method of claim 11, further comprising displaying the at least one recommendation in the graphical representation, the graphical representation comprising one or more recommendations for each entity in the computing environment that has been evaluated.

13. A non-transitory computer readable storage medium comprising computer executable instructions for:
    obtaining resource utilization or performance data pertaining to a plurality of computing entities in a computing environment, and capacity data specifying resource capacities for the plurality of computing entities in the computing environment;
    obtaining at least one operational policy defining criteria to determine whether the utilization or performance of an entity is in an acceptable range relative to its capacity or performance limits;
    computing at least one score quantifying efficiencies and/or risks associated with corresponding ones of the entities in the computing environment, based on the resource utilization or performance data, the capacity data, and the at least one operational policy; and
    displaying an indicator for at least one of the plurality of computing entities in a graphical representation based on the corresponding score;
    wherein each indicator is positioned in the graphical representation according to the corresponding score such that the positioned indicator shows in a spatial manner, relative efficiencies and/or risks for the corresponding entity by positioning the indicator in one of a first portion indicative of risk associated with having infrastructure in the computing environment that cannot service workload demands and meet criteria specified in the at least one operational policy, a second portion indicative of an amount of infrastructure in the computing environment that can service workload demands based on the at least one operational policy, or a third portion indicative of inefficiencies associated with having more than the required amount of infrastructure in the computing environment to service workload demands based on the at least one operational policy.

14. A system for analyzing efficiencies and risks in a computing environment, the system comprising a processor and at least one memory, the memory comprising computer executable instructions for:
    obtaining resource utilization or performance data pertaining to a plurality of computing entities in a computing environment, and capacity data specifying resource capacities for the plurality of computing entities in the computing environment;

obtaining at least one operational policy defining criteria to determine whether the utilization or performance of an entity is in an acceptable range relative to its capacity or performance limits;

computing at least one score quantifying efficiencies and/or risks associated with corresponding ones of the entities in the computing environment, based on the resource utilization or performance data, the capacity data, and the at least one operational policy; and displaying an indicator for at least one of the plurality of computing entities in a graphical representation based on the corresponding score;

wherein each indicator is positioned in the graphical representation according to the corresponding score such that the positioned indicator shows in a spatial manner, relative efficiencies and/or risks for the corresponding entity by positioning the indicator in one of a first portion indicative of risk associated with having infrastructure in the computing environment that cannot service workload demands and meet criteria specified in the at least one operational policy, a second portion indicative of an amount of infrastructure in the computing environment that can service workload demands based on the at least one operational policy, or a third portion indicative of inefficiencies associated with having more than the required amount of infrastructure in the computing environment to service workload demands based on the at least one operational policy.

15. The method of claim 5, wherein scoring a cluster of computing systems comprises considering at least one of: workload affinity or anti-affinity, data security, load balancing, failover capacity, or other business related data that impacts quantification of efficiencies and risks.

16. The non-transitory computer readable medium of claim 13, wherein the graphical representation displays the scores spatially relative to each other, for each computing entity in the computing environment by placing each indicator in a corresponding portion of the graphical representation.

17. The non-transitory computer readable medium of claim 13, wherein the portions of the graphical representation are arranged to create a spectrum.

18. The non-transitory computer readable medium of claim 13, further comprising instructions for displaying a plurality of graphical representations.

19. The non-transitory computer readable medium of claim 13, further comprising instructions for:

using the at least one score to generate at least one recommendation for addressing inefficiencies and/or risks in the computing environment; and displaying the at least one recommendation in the graphical representation, the graphical representation comprising one or more recommendations for each entity in the computing environment that has been evaluated.

* * * * *

(12) EX PARTE REEXAMINATION CERTIFICATE (12028th)
United States Patent
Hillier

(10) Number: US 9,654,367 C1
(45) Certificate Issued: Apr. 4, 2022

(54) SYSTEM AND METHOD FOR DETERMINING AND VISUALIZING EFFICIENCIES AND RISKS IN COMPUTING ENVIRONMENTS

(71) Applicant: Cirba Inc., Richmond Hill (CA)

(72) Inventor: Andrew Derek Hillier, Toronto (CA)

(73) Assignee: CIRBA IP INC.

Reexamination Request:
No. 90/014,736, Apr. 22, 2021

Reexamination Certificate for:
Patent No.: 9,654,367
Issued: May 16, 2017
Appl. No.: 14/180,438
Filed: Feb. 14, 2014

Related U.S. Application Data

(63) Continuation of application No. PCT/CA2012/050561, filed on Aug. 16, 2012.

(60) Provisional application No. 61/523,912, filed on Aug. 16, 2011.

(51) Int. Cl.
*H04L 43/0876* (2022.01)
*H04L 41/0896* (2022.01)
*G06F 11/34* (2006.01)
*G06F 11/32* (2006.01)

(52) U.S. Cl.
CPC ........ *H04L 43/0876* (2013.01); *G06F 11/328* (2013.01); *G06F 11/3409* (2013.01); *G06F 11/3442* (2013.01); *G06F 2201/815* (2013.01); *H04L 41/0896* (2013.01)

(58) Field of Classification Search
None
See application file for complete search history.

(56) References Cited

To view the complete listing of prior art documents cited during the proceeding for Reexamination Control Number 90/014,736, please refer to the USPTO's public Patent Application Information Retrieval (PAIR) system under the Display References tab.

*Primary Examiner* — Eron J Sorrell

(57) ABSTRACT

A system and method are provided for determining and visualizing efficiencies and risks in computing environments. The method comprises obtaining resource utilization data and resource capacity data for a plurality of entities in a computing environment; obtaining at least one operational policy defining at appropriate level of at least one resource used by the computing environment according to at least one factor; and computing at least one score quantifying efficiencies and risks associated with the computing environment based on the resource utilization data, resource capacity data, and at least one operational policy.

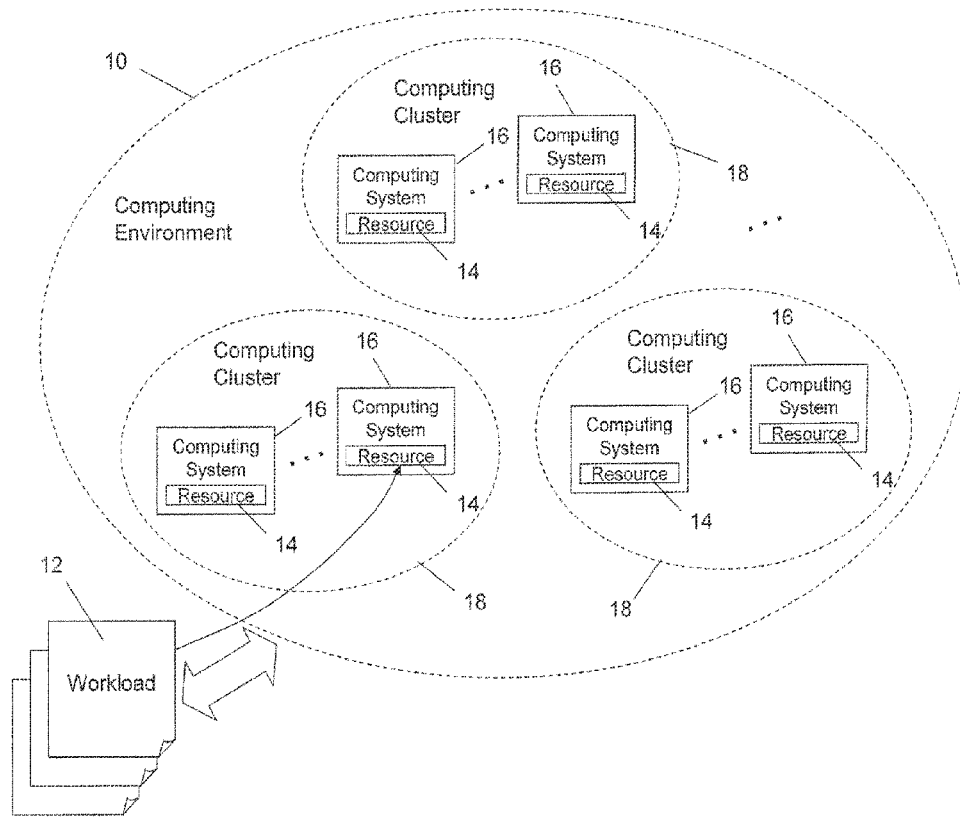

EX PARTE
REEXAMINATION CERTIFICATE

NO AMENDMENTS HAVE BEEN MADE TO
THE PATENT

AS A RESULT OF REEXAMINATION, IT HAS BEEN DETERMINED THAT:

The patentability of claims 1-19 is confirmed.

\* \* \* \* \*